United States Patent [19]
Barton et al.

[11] 3,755,304
[45] Aug. 28, 1973

[54] SAPOGENOIC ACID DERIVATIVES
[76] Inventors: Derek Harold Richard Barton; Peter George Sammes, both of c/o Department of Chemistry, Imperial College of Science & Technology, London, S.W. 7, England
[22] Filed: Oct. 8, 1970
[21] Appl. No.: 79,345

[52] U.S. Cl.................................260/239.55 R, 260/239.57, 260/397.1, 260/397.45
[51] Int. Cl................... C07c 173/00, C07c 173/08
[58] Field of Search................. 260/239.55, 239.57, 260/239.55 A

[56] References Cited
UNITED STATES PATENTS
3,051,703  8/1962  Djerassi et al. ................ 260/239.55
3,124,570  3/1964  Levine et al. .................. 260/239.55

*Primary Examiner*—Elbert L. Roberts
*Attorney*—Bacon & Thomas

[57] ABSTRACT

Sapogenoic acids and derivatives thereof are reacted with carbon nucleophiles to introduce the nucleophilic residue into the 16-position. The reaction products can be converted into 16-substituted $\Delta^{16}$-pregn-20-ones.

13 Claims, No Drawings

SAPOGENOIC ACID DERIVATIVES

The present invention relates to a novel process for the introduction of a 16-substituent in the preparation of 20-keto-pregnanes from sapogenins.

It is well known to prepare $\Delta^{16}$-pregn-20-ones, which are important intermediates in the production of anti-inflammatory drugs of the corticoid type and other physiologically active pregnanes, from sapogenins such as hecogenin by the Marker route. This involves the rupture of the spiroketal structure, e.g. by acylolysis to a pseudosapogenin, oxidation of the resulting 20,22-double bond and hydrolysis of the resulting 16-ester with simultaneous dehydration:

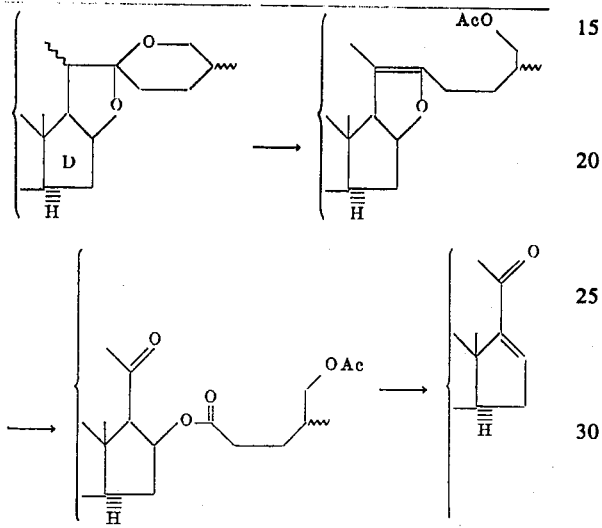

Various routes have been adopted for the subsequent introduction of substituents in the D-ring; particularly the pharmacologically desirable alkyl groups and especially the methyl group at the 16-position. This has, for example, been effected by reaction of the $\Delta^{16}$-20-ketone with alkylating reagents such as Grignard reagents.

It has now been discovered that the sapogenoic acids, which are readily obtainable by oxidation of sapogenins, and functional derivatives of these acids, can be reacted directly with carbon nucleophiles, including Grignard reagents, to introduce the nucleophile residue into the 16-position in good yields and that the reaction products can readily be converted by the above reactions of the Marker route or other more direct routes into 16-substituted $\Delta^{16}$-pregn-20-ones.

Sapogenins yield, on careful oxidation with chromic acid in the presence of acetic acid good yields of sapogenoic acids possessing the partial structure

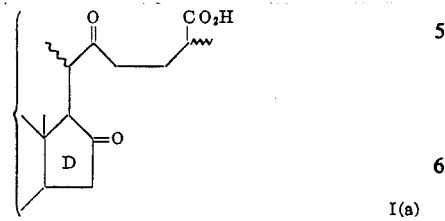

I(a)

and according to the present invention these readily obtainable sapogenoic acids, and functional derivatives thereof such as esters, primary, secondary or tertiary amides or nitriles, can be reacted with a carbon nucleophile to introduce the residue of the nucleophile at the 16-position without attack by the nucleophile on the 22-keto group. As is indicated hereinafter, the 22-keto group in free or protected form is required for the subsequent conversion into the desired $\Delta^{16}$-pregn-20-ones. This means that residues of nucleophiles, and in particular alkyl groups, may be incorporated at the 16-position in the sapogenoic acid or derivative thereof, and that the product can then be readily converted into a 16-substituted $\Delta^{16}$-pregn-20-one.

In general, the reaction of the carbon nucleophile at the 16-position provides a 16-ol which, in the presence of the 22-keto grouping, forms a 16 → 22 ketal, usually with accompanying cyclisation to form a 22-spiro structure. Thus, the sapogenoic acid itself reacts initially to form the partial structure

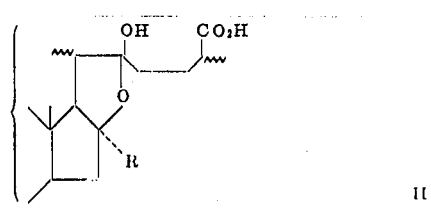

II which dehydrates to yield the spiro δ-lactone but can also give some $\Delta^{20(22)}$ product of the structure

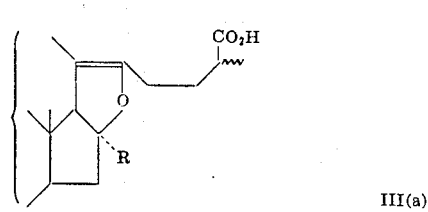

III(a)

(where R is the residue of the carbon nucleophile). The carboxyl group, by forming a carboxylate anion, is protected from attack by the nucleophile.

The corresponding esters, on the other hand, can react at the ester carbonyl grouping with the carbon nucleophile producing initially a product of the partial structure

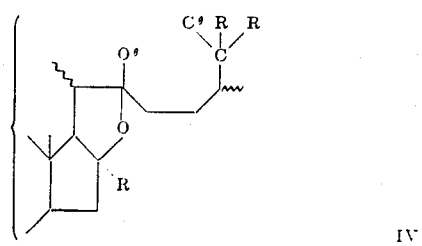

IV which gives a 16α, 26,26-trisubstituted sapogenin:

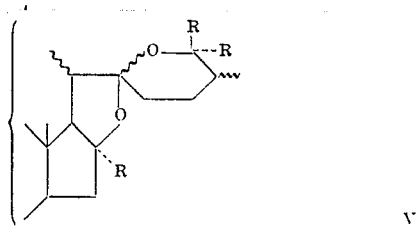

V (where R represents the residue of the nucleophile).

Where the derivative of the sapogenoic acid is a primary or secondary amide, the reaction proceeds analogously to that with the acid, the formation of an anion with base preventing carbon nucleophile attack at the 26-position.

The product has thus the partial structure

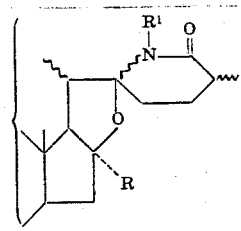

VI (where R represents the residue of a nucleophile and $R^1$ represents a hydrogen atoms or the N-residue of the secondary amide). A tertiary amide, however, cannot form the spiro structure VI and yields instead the amide analogue of structure III(a).

The nitrile can react in a manner analogous to that of the ester, providing a 26-substituted cyclic imino or 26-disubstituted cyclic amino analogue of the spiro ketal structure V, or alternatively non-reaction of the nitrile group with the nucleophile will prvide the nitrile analogue of structure III(a).

The reaction according to the present invention may thus be summarised in that a sapogenoic acid or derivative thereof of the partial formula

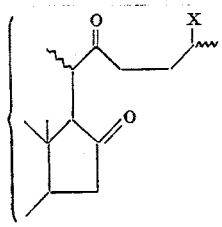

I (where X represents a carboxyl, carboxyl ester, carbonamide, substituted carbonamide or nitrile group) is reacted with a carbon nucleophile to yield a steroid of the partial formula

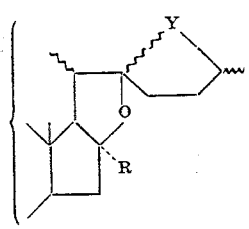

VII (where Y represents a group of the formula —O·CO—, —O·CR$_2$ — , —NR$^1$·CO — , —N=CR—, or —NH·C-R$_2$—, R represents the residue of the carbon nucleophile and $R^1$ has the above meaning) or a steroid of the partial formula

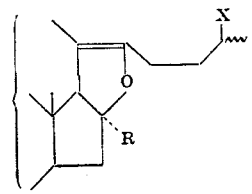

III (where R represents the residue of the carbon nucleophile and X represents a carboxyl, nitrile or tertiary carbonamido group).

Any suitable carbon nucleophile may be used in the reaction and, in general, those previously used with the $\Delta^{16}$-20-one system can be similarly used in the reaction according to the present invention. Particularly advantageous nucleophiles are provided by Grignard reagents, for example aliphatic, araliphatic or aryl magnesium halides such as alkyl, alkenyl, alkynyl or phenyl magnesium halides, e.g., the bromides and iodides, particularly methyl magnesium bromide; organolithium compounds such as alkyl lithiums or aryl lithiums, e.g. butyl or phenyl lithium, other Grignard reagents, such as cadmium; zinc and thallium Grignard reagents; and metal salts, e.g. alkali metal salts, of reagents containing an activated methylene group, for example malonic esters and malononitrile. For introducing lower alkyl groups at the 16-position, the commonly used magnesium Grignard reagents are particulately suitable preferably in an anhydrous ether solvent such as tetrahydrofuran.

Where the group X itself reacts with one or more equivalents of the carbon nucleophile, the reaction conditions should be chosen so that a sufficient excess of the nucleophile is present, thus, when using the sapogenoic ester, at least 3 equivalents of nucleophile may be required.

Naturally, any labile groupings present in the sapogenoic acid compound must be protected if the nucleophilic reaction or any of the other reactions involved would otherwise undesirably affect them.

However, some groupings commonly present in sapogenins may react with the nucleophile to produce useful products of the desired type with no substantial disadvantages other than the consumption of additional nucleophile. Thus, for example, a 3-acyloxy group will normally react to generate a 3-hydroxy group; where a 3-acyloxy group is required in subsequent reactions, re-acylation can readily be effected, e.g. using an acyl anhydride in the presence of pyridine.

In general, the 3-position may, for example, carry a hydroxy group, an ether group, an ester group or a protected keto group such as a ketal group. The 6-position may, for example, carry a halogen substituent such as a fluorine atom or a methyl group. The 11- and 12-positions may carry, for example, hydroxy, ether, ester or protected or unprotected keto groups or halogen atoms. The configuration at the 5-position may be α- or β- or there may be a $\Delta^5$ double bond. The 9-position may for example carry a halogen atom such as fluorine or a double bond may be present in the 9,11-position provided a 12-keto group is also present. A 9,11-epoxy group may alternatively be present. The configuration at the 20- and 25-carbon atoms may be α or β, the methyl group at the 20-position preferably being in the α-configuration.

The subsequent conversion of the product of partial structure VII or III into the desired 20-keto-Δ$^{16}$-pregnene may be effected by a number of routes.

Compounds of the partial structure VII in which Y represents other than the O·CO. grouping may be subjected to a three-stage degradation by the Marker method comprising fission of the spiroketal system, e.g. by acylation, to form a pseudosapogenin; oxidative cleavage of the 20(22)-double bond of the pseudosapogenin to form a 16-acyloxy-pregn-20-one and hydrolysis with dehydration to form the desired Δ$^{16}$-pregn-20-one.

Conveniently, the spiroketal system may be broken by treatment with an acyl anhydride, e.g., acetic anhydride, at a suitably elevated temperature. Other suitable anhydrides include n-butyric and octanoic anhydride, while the fission may be catalysed by Lewis acids, sodium acetate, zinc acetate, trichloroacetic acid, aluminium chloride, pyridine hydrochloride, ammonium chloride, methylammonium chloride, etc.

The oxidative cleavage of the 20(22)-double bond may be effected with any suitable reagent, for example chromium trioxide reagents such as chromic-acetic acid solutions conveniently at room temperature. Other oxidising reagents suitable for this purpose include ozone, or permangate in alkaline conditions or osmium tetroxide to give the glycol followed by lead tetracetate or periodate glycol fission.

The hydrolysis of the 16-ester intermediate is conveniently effected with a base, e.g. an alkali metal hydroxide such as potassium hydroxide, conveniently in an alcohol such as t-butanol. Dehydration to produce the Δ$^{16}$-steroid occurs spontaneously under such conditions.

Pseudosapogenins of the partial structure III, may be converted into the desired Δ$^{16}$-pregn-20-ones using only the last two of the above three stages, i.e., oxidation of the 20,(22)-double bond and hydrolysis of the 16-ester.

A particularly short route to the Δ$^{16}$-pregn-20-one is afforded by the δ-lactones of partial structure VII in which Y represents O·CO. It has been found that oxygenation of the δ-lactone in the presence of base yields the Δ$^{16}$-pregn-20-one directly by autoxidation. Thus treatment with an alkali metal alkoxide e.g., potassium alkoxide such as potassium t-butoxide, in a cyclic ether solvent, particularly dioxan, yielded the desired product. The reaction appears to proceed via the action of free radicals since the use of freshly distilled dioxan inhibits the autoxidation reaction. A suitable aprotic co-solvent, e.g., a phosphoramide such as hexamethylphosphoric triamide, may often be added advantageously.

This base-catalysed lactone autoxidation also provides an alternative route from the compound of partial formula V to the desired Δ$^{16}$-pregn-20-one. The 26,26-disubstituted sapogenin F-ring can be oxidised, e.g., with chromic-acetic acid to yield the corresponding γ-lactone of partial formula:

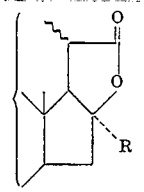

VIII (where R represents the residue of the carbon nucleophile) and this γ-lactone may also be autoxidised under similar conditions to those used for the autoxidation of the γ-lactone.

According to a further feature of the present invention there are provided sapogenin derivatives of the partial formulae III, VII and VIII as defined above. In particular there are provided 9α,11α-epoxytigogenin, and 9α-fluoro-11-ketotigogenin derivatives of the partial formulae, III, VII and VIII and Δ$^{9(11)}$-hecogenin derivatives of the partial formulae III, VII and VIII. Many of the compounds of the partial formula I are also novel and accordingly there are further provided sapogenoic acids and derivatives thereof of the partial formula I as defined above, with the exception of tigogenoic acid and hecogenoic acid. Particularly useful intermediates of the formula I are the Δ$^{9(11)}$-hecogenin derivatives and 9α,11α-epoxytigogenin and 9α-fluoro-11-ketotigogenin derivative of formula I.

The following examples are given by way of illustration only: all temperatures are in °C:

EXAMPLE 1

Δ$^{9(11)}$-Hecogenoic Acid Acetate

Chromium trioxide (2.0 g, 0.02 mole) dissolved in 80 percent acetic acid (20 ml) was added dropwise into a solution of Δ$^{9(11)}$-hecogenin acetate (2.0 g, 0.00424 mole) in acetic acid (60 ml) and the reaction mixture was stirred at room temperature. The oxidation was followed by thin layer chromatography (t.l.c.) and after 6 hours the reaction was completed. The reaction mixture was poured over crushed ice (120 g) and extracted with ether (5 × 50 ml). The ether extract was washed with cold water, dried and concentrated. The crude product was recrystallised from ethyl acetate and petroleum ether. Yield 2.0 g (94 percent). m.p. 184°–86°· [α]$^{26}$ − 75° (c, 1.2)· λ$_{max}$ at 237 nm (ε 12,200). ν$_{max}$ at 3450 (carboxylic acid), 1725, 1250 (acetate), 1700 (22-ketone), 1670 (12-ketone) and 1600 cm$^{-1}$ (double bond). Found: C, 69,48; H, 8.27; C$_{29}$H$_{40}$O$_7$ requires C, 69.57; H, 8.05 percent.

EXAMPLE 2

Methyl-Δ$^{9(11)}$-hecogenoate acetate

Δ$^{9(11)}$-Hecogenoic acid acetate (0.2 g) was dissolved in dichloromethane (5 ml) and at 0° was treated with freshly prepared diazomethane in ether (10 ml). Solvents were removed and the residue was crystallised from ethyl acetate and petroleum ether (rectangular plates). Yield 0.21 g (quantitative). m.p. 159°–61°· [α]$^{26}$ − 77° (c, 1.25)· λ$_{max}$ at 237 nm (ε, 12,400)· ν$_{max}$ 1725 (methylester, acetate), 1670 (12-ketone), 1605 (double bond) and 1250 cm$^{-1}$ (acetate). Found : C, 69.88; H, 8.02, C$_{30}$H$_{42}$O$_7$ requires C, 70.01; H, 8.23 percent.

EXAMPLE 3

9α, 11α-Epoxy-tigogenin acetate

Δ$^{9(11)}$-Tigogenin acetate (5.0 g) was dissolved in chloroform (50 ml) and to this an ethereal solution of monoperphthalic acid (30 ml, containing 1.5 equivalent of the reagent) was added. It was stirred at room temperature for 12 hours, at the end of which t.l.c. indicated that all the starting material had reacted. The reaction mixture was filtered to remove the separated phthalic acid and the filtrate was washed first with aqueous sodium bicarbonate (5 percent, 3 × 25 ml) and then with water (3 × 25 ml). It was dried, solvents removed and the residue was recrystallised from ethylacetate (long needles). Yield 4.8 g (93 percent) m.p. 265°–66° · $[\alpha]^{28}$ −74.6° (c, 0.98). $\lambda_{max}$ 1725, 1250 cm$^{-1}$ (acetate). Found: C, 73.35; H, 9.53. $C_{29}H_{44}O_5$ requires C, 73.68; H, 9.38 percent.

EXAMPLE 4

9α,11α-Epoxy-tigogenoic acid acetate

The product of Example 3 (2.0 g) in glacial acetic acid (60 ml) was stirred at room temperature whilst adding chromium trioxide (2.0 g) in 80 percent acetic acid (20 ml). After addition (10 minutes), the reaction mixture was stirred for a further 6 hours, before pouring into cold water (150 ml) and ether extraction (3 × 100 ml). The ether extract was washed with water, dried and evaporated. The residue was triturated several times with petroleum ether, before recrystallisation from ethyl acetate and petroleum ether, to give the pure 9α,11α-epoxy-tigogenoic acid acetate. Yield 1.2 g (56 percent). m.p. 210°–12°. $[\alpha]^{25}$ − 138.1° (c 1.19)· $\nu_{max}$ 3200 (carboxylic acid), 1725, 1250 (acetate) and 1705 cm$^{-1}$ (22-ketone). Found: C, 68.92; H, 8.13; $C_{29}H_{42}O_7$ requires C, 69.33; H, 8.36 percent.

EXAMPLE 5

Methyl 9α, 11α-epoxy-tigogenoate acetate

The crude product of Example 4 (1.0 g) in dichloromethane (20 ml) was treated with an excess of ethereal diazomethane (20 ml) at 0° for 1 hour. After the removal of the solvents, the residue was recyrstallised from methanol (needles) to yield 0.77 g (75 percent) of methyl 9α,11α-epoxytigogenoate acetate m.p. 180°–83°·$[\alpha]^{24}$ − 120.3°(c, 0.62)· $N_{max}$ 1725 (ester and acetate), 1705 (C-22 carbonyl) and 1250 cm$^{-1}$ (acetate). Found: C, 69.87; H, 8.53; $C_{30}H_{44}O_7$ requires C, 69.78; H, 8.58 percent.

EXAMPLE 6

9α,11α-Epoxy-16α,26,26-trimethyl-tigogenin acetate

The methyl ester from Example 5 (1.01 g) was dissolved in tetrahydrofuran (THF) (20 ml) and added dropwise during 10 minutes into a well stirred Grignard reagent made from magnesium (0.48 g, 10 equivalent), methyl iodide (1.5 ml) and dry ether (20 ml) at 0° in an atmosphere of dry nitrogen. The mixture was stirred at 0° for a further 45 minutes and then treated with cold 4N sulphuric acid (10 ml) before being extracted with ether (3 × 150 ml). The ether extract was washed with water (3 × 50 ml), dried and concentrated. The residue was reacetylated with acetic anhydride (3 ml) and pyridine (3 ml) at room temperature, overnight, before addition of cold water (100 ml) and ether extraction (3 × 150 ml). The ether extract was washed with water, dried and evaporated to yield by direct crystallisation from ethanol, needles of 9α,11α-epoxy-16α,26,26-trimethyl-tigogenin acetate Yield 0.62 g, (61 percent). m.p. 195°–97°· $[\alpha]^{25}$ − 48.6° (c, 0.7)· $\nu_{max}$ 1725 and 1250 cm$^{-1}$ (acetate). Found: C, 74.31; H, 9.80; $C_{32}H_{50}O_5$ requires C, 74.67; H, 9.79%.

EXAMPLE 7

γ-Lactone of 3β-acetoxy-9α,11α-epoxy-16α-methyl-16β-hydroxy-20-carboxy pregnane

The product from Example 6 (1.1 g) in glacial acetic acid (30 ml) was treated with chromium trioxide (1.1 g) in 80 percent acetic acid (11 ml) with stirring at room temperature. The reaction (t.l.c. control) was completed in 1 hour. Ethanol (5 ml) was added to destroy the excess of the oxidant and after 15 minutes the reaction mixture was poured into water (150 ml) and ether extracted (3 × 150 ml). The organic layer was washed with water, aqueous bicarbonate (5 percent, 3 × 25 ml) and finally with water. It was then dried and concentrated to yield the pure γ-lactone as plates from methanol. 0.78 g, (88 percent). m.p. 287°–89°· $[\alpha]^{26}$ − 57.7° (c, 0.97). $\nu_{max}$ 1770 (γ-lactone), 1725 and 1250 cm$^{-1}$ (acetate). Found: C, 71.97; H, 8.77; $C_{25}H_{36}O_5$ requires C, 72.08; H, 8.71 percent.

EXAMPLE 8

3β-Acetoxy-9α,11α-epoxy-16-methyl-pregn-16-en-20-one

The product from Example 6 (0.25 g) was refluxed in acetic anhydride (10 ml) containing fused sodium acetate (0.1 g) in an atmosphere of nitrogen. At the end of the reaction (t.l.c. control, 40 hours), most of the acetic anhydride was distilled in vacuo and the residue in acetic acid (5 ml) was treated at 20° with chromium trioxide (0.5 g) in 80 percent acetic acid (2 ml) and stirred at room temperature for 3 hours. It was then poured in water (25 ml), extracted with ether (3 × 100 ml) and the ether layer was washed, dried and evaporated. The residue was redissolved in t-butanol (10 ml) and treated with potassium hydroxide (0.5 g in 1 ml water) solution and stirred at room temperature for 3 hours. Water (50 ml) was added and ether extracted (3 × 100 ml). The ether layer was washed, dried and evaporated and the residue was reacetylated with acetic anhydride (1.5 ml) in pyridine (1.5 ml) at room temperature. After the usual work up, the reacetylated products were separated by p.l.c. and the UV visible portion was cut out, eluted with acetone, evaporated and the residue was recrystallised from methanol (large plates) to give the pure title compound 0.08 g (42.6 percent). m.p. 173°–76°·$[\alpha]^{27}$ − 17.7° (c, 0.56)·$\lambda_{max}$ 247 nm (ε, 9810). $\nu_{max}$ 1725, 1250 (acetate), 1660 (20-ketone) and 1605 cm$^{-1}$ ($C_{16}$–$C_{17}$ double bond). Found: C, 73.97; H, 8.66; $C_{24}H_{34}O_4$ requires C, 74.57; H, 8.87 percent.

EXAMPLE 9

3β-Acetoxy-9α,11α-epoxy-pregn-16-en-20-one

9α,11α-Epoxy-tigogenin acetate (1.0 g) in acetic anhydride (15 ml) and pyridine hydrochloride (0.25 g) was refluxed in nitrogen atmosphere for 8 hours. Most of the acetic anhydride was removed in vacuo and the residue was dissolved in acetic acid (30 ml) and treated at 20° with chromium trioxide (1.0 g) in 80 percent acetic acid (10 ml). The mixture was stirred for 3 hours and later poured into cold water (100 ml) and extracted with ether (3 × 200 ml). The ether layer was washed with water, dried and concentrated. It was then dissolved in methanol (50 ml) and treated in the cold with methanolic potassium hydroxide (2.0 g in water 1 ml and diluted with methanol, 20 ml). This mixture was stirred at room temperature for 3 hours, before being acidified with acetic acid and concentrated. The residue was taken up in water (100 ml) and ether extracted. The crude product was then reacetylated with acetic anhydride and pyridine (1:1, 6 ml) at room temperature overnight. The crude product was separated into the reaction products by preparative layer chromatography. Pure 3β-acetoxy-9α,11α-epoxypregn-16-en-20-one was recrystallised from methanol (rectangular plates). Yield 0.19 g, (25.5 percent). m.p. 158°–60°. $[\alpha]^{20} + 26.3°$ (c, 0.91). $\nu_{max}$ 238 nm ($\epsilon$, 8980)· $\nu_{max}$ 1730, 1250 (acetate), 1660 (20-ketone) and 1600 cm$^{-1}$ ($\Delta^{16}$). Found: C, 73.86; H, 8.84; $C_{23}H_{32}O_4$ requires C, 74.16; H, 8.66 percent.

EXAMPLE 10

9α,11α-Epoxy-16α,26,26-triethyl-tigogenin acetate

The methyl ester from Example 5 (0.9 g) in dry THF (20 ml) was added during 10 minutes to a well stirred Grignard reagent made from magnesium (0.45 g, 10 equivalent), ethyl iodide (1.5 ml) and dry ether (20 ml), at 0° in a current of dry nitrogen. The mixture was stirred for 45 minutes, cold 4N sulphuric acid (10 ml) was added and the product was extracted with ether (3 × 200 ml). The ether extract was washed with water, dried and then evaporated and the residue was reacetylated with acetic anhydride and pyridine (1:1, 6 ml) at room temperature overnight. After the work up, products were separated by p.l.c. and final purification was achieved by crystallisation from absolute ethanol (plates), to yield 9α,11α-epoxy-16α, 26, 26-triethyl-tigogenin acetate 0.15 g (15 percent). m.p. 187°–89°·$[\alpha]^{25} -35.5°$ (c, 0.93)·$\nu_{max}$ 1725, 1250 cm$^{-1}$ (acetate). Found: C, 75.33; H, 10.18; $C_{35}H_{56}O_5$ requires C, 75.49; H, 10.14 percent.

EXAMPLE 11

3β-Acetoxy-9α,11α-epoxy-16-ethyl-pregn-16-en-20-one

In this experiment, methyl ester from Example 5 was subjected to the Grignard reaction ($C_2H_5MgI$) and the product, without isolation, was degraded by a three step process, as follows:

The methyl ester (1.02 g) was dissolved in THF (30 ml) and added dropwise into the Grignard reagent made from magnesium (0.5 g), ethyl iodide (1.5 ml) and dry ether (20 ml) at 0° for 1 hour. After the work up, the crude reaction product was refluxed in acetic anhydride (15 ml) containing pyridine hydrochloride (0.25 g) in nitrogen for 16 hours. Most of the acetic anhydride was removed in vacuo and the residue in glacial acetic acid (30 ml) was oxidised by treating in the cold with chromium trioxide (1.0 g) in 80 percent acetic acid (10 ml) and stirring at room temperature for 3 hours. Water (150 ml) was added and the reaction mixture was extracted with ether. The organic layer was washed, dried and evaporated. The residue was dissolved in methanol (50 ml) and saponified cold by the addition of methanolic potassium hydroxide (1.0 g) at room temperature stirring for 3 hours. It was then acidified with acetic acid, concentrated and the residue was diluted with water and ether extracted (3 × 150 ml). The ether extract was washed with water, dried and evaporated. The residue was reacetylated with acetic anhydride-pyridine at room temperature overnight. After the usual work up, the products were separated by p.l.c. Pure title compound was obtained by re-crystallisation from methanol (fine needles), yield 0.16 g (20 percent). m.p. 182°–85°· $[\alpha]^{23} -15.3°$ (c, 0.98)· $\lambda_{max}$ 250 nm ($\epsilon$, 8700)·$\nu_{max}$ 1730, 1250 (acetate), 1650 (20-ketone) and 1605 cm$^{-1}$ Found: C, 74.80; H, 9.30; $C_{25}H_{36}O_4$ requires C, 74.96; H, 9.06 percent.

EXAMPLE 12

$\Delta^{8(11)}$—16α,26,26-trimethyl hecogenin acetate

Methyl ester from Example 2 (0.25 g) was dissolved in THF (6 ml) and added to a Grignard reagent made from magnesium (85 mg, 7 equivalent), methyl iodide (1 ml) and ether (10 ml) at 0°. The reaction mixture was stirred for 0° for a total of 25 minutes, before adding 4N sulphuric acid (5 ml) and extraction with ether (3 × 100 ml). The residue obtained after ether was removed was reacetylated at room temperature overnight with acetic anhydride and pyridine. After the usual work-up the crude products were separated by p.l.c., a nonpolar UV-visible compound was obtained as plates from ethanol, yield 38 mg (15 percent) and characterised as $\Delta^{8(11)}$—16α, 26, 26-trimethyl-hecogenin acetate m.p. 202°–03°, $[\alpha]^{26} + 31.66°$ (c, 0.6)·$\lambda_{max}$ 238 nm ($\epsilon$, 13500)·$\nu_{max}$ 1730, 1250 (acetate), 1670 (12-ketone) and 1605 (double bond). Found: C, 74.82; H, 9.72; $C_{32}H_{48}O_5$ requires C, 74.92; H, 9.44 percent.

EXAMPLE 13

9α,11α-Epoxy-16α-methyl-26-oxo-tigogenin acetate

9α,11α-Epoxy-tigogenoic acid acetate (1.0 g) was dissolved in THF (25 ml) and added during 15 minutes into a well stirred Grignard reagent made from Mg (0.5 g, 10 equivalent), $CH_3I$ (1.5 ml) and dry ether (15 ml) at 0°. It was stirred for a further 15 minutes. Cold 4N sulphuric acid (15 ml) was added and the mixture extracted with ether (3 × 200 ml). The ether extract was washed with water, dried and evaporated. The residue was acetylated at 100° for 6 hours with acetic anhydride (5 ml). The reaction mixture was cooled, diluted with water and extracted with ether washed, dried and evaporated. The crude products were dissolved in ethanol and kept at 0° for crystallisation. Pure compound identified as 9α,11α-epoxy-16α-methyl-26-oxo-tigogenin acetate separated out as rectangular plates, yield 0.54 g (54 percent)· m.p. 282°–84°· $[\alpha]^{25} -45°$ (c 0.26). $\nu_{max}$ 1770 (26-ketone), 1730 and 1250 (acetate). Found: C, 71.76; H, 8.96; $C_{30}H_{44}O_6$ requires C, 71.97; H, 8.86 percent.

EXAMPLE 14

9α,11α-epoxy-16α-ethyl-26-oxo-tigogenin acetate

9α,11α-epoxy-tigogenoic acid acetate (0.5 g) in the THF (15 ml) was added dropwise (10 minutes) to a Grignard reagent (from magnesium 0.25 g, ethyl iodide 1.5 ml and ether 15 ml) at 0° in dry nitrogen. It was stirred at 0° for 45 minutes before addition of 4N sulphuric acid (5 ml) and ether extraction (3 × 150 ml). The crude product was acetylated with acetic anhydride at 100° for 6 hours, cooled, water was added and the product reextracted with ether. After the usual work-up the crude products were separated by plate layer chromatography and pure product (plates) obtainable from ethanol was characterised as 9α,11α-epoxy-16α-ethyl-26-oxo-tigogenin acetate Yield 0.18 g (35 percent). m.p. 273°–75° $[\alpha]^{23} -58.5°$ (c, 0.65)· $\nu_{max}$ 1755 (δ-lactone), 1725 and 1250 (acetate). Found: C, 72.29; H, 9.04; $C_{31}H_{46}O_6$ requires C, 72.34; H, 9.01 percent.

EXAMPLE 15

9β,11β-Epoxy-tigogenin acetate

Δ$^{9(11)}$-tigogenin acetate (4.6 g, 0.01 mole) was suspended in dioxan (120 ml) and water (20 ml) and treated with N-bromoacetamide (1.5 g, 0.011 mole) and 10 percent aqueous perchloric acid (12 ml) with vigorous stirring at room temperature for 30 minutes. Saturated aqueous sodium sulphite (50 ml) was added and the reaction mixture was extracted with chloroform (3 × 150 ml). The organic layer was washed with saturated saline (50 ml), dried and evaporated in the presence of added pyridine (2 ml). The residue was dissolved in methanol (200 ml) and treated in the cold (10°) with methanolic potassium hydroxide (2.0 g) and stirred at room temperature for 1 hour. It was then acidified (acetic acid) and concentrated in vacuo. The residue was taken up in water (100 ml) and ether extracted (3 × 200 ml). The ether layer was washed, dried and evaporated and the residue reacetylated at room temperature with acetic anhydride in pyridine (1:1, 10 ml) After 12 hours the crude material was isolated and recrystallised from methanol. Yield 2.9 g (61.7 percent). It was pure enough for the next step. An analytical sample was made by t.l.c. purification and repeated recrystallisations from absolute methanol (bright prisms). m.p. 216°–17°· [α]$^{26}$ − 60.0° (c, 0.75). $\nu_{max}$ 1725 and 1250 (acetate). p.m.r. signals at τ 9.25 (3 H$_d$, J = 6 Hz, 25-Me), 9.17 (3 H$_d$, J = 6 Hz, 20-Me), 9.05 (3 H$_s$, 13-Me), 8.98 (3 H$_s$, 10-Me), 8.00 (3 H$_s$, 3β-acetate) 6.60 (2 H$_m$, 11α-H and 16α-H) and 5.50 (1 H$_m$, 3α-H). Found: C, 73.80; H, 9.54; $C_{29}H_{44}O_5$ requires C, 73.69; H, 9.38 percent.

EXAMPLE 16

11-Keto-tigogenin acetate and 9α-fluoro-11β-hydroxy-tigogenin acetate

A precooled solution of β-epoxide from Example 15 (0.5 g) in dichloromethane (10 ml) was added gradually into a stirred solution of anhydrous HF (5 ml) in dichloromethane (10 ml) at −70°. It was further stirred for 2½ hours and later left at room temperature overnight. Excess of HF was decomposed by the slow addition of potassium carbonate (10 percent, 50 ml) and the reaction mixture was extracted with dichloromethane (3 × 50 ml). The organic layer was collected, washed once with saturated sodium chloride solution (50 ml), dried and concentrated. The crude products were reacetylated at room temperature with acetic anhydride and pyridine. After the usual work up, two products were obtained, by p.l.c. separation. The major product (higher Rf) was 11-keto-tigogenin acetate, yield 0.155 g (31 percent), needles from ethanol. m.p. 224°–27°. [α]$^{25}$ − 36.7° (c, 0.98)· $\nu_{max}$ 1725, 1250 (acetate) and 1695 cm$^{-1}$ (11-ketone). Found: C, 73.39; H, 9.33; $C_{29}H_{44}O_5$ requires C, 73.69; H, 9.38 percent. The literture gives m.p. 222°– 30°, by the oxidation of 9α-bromo-11β-hydroxy-tigogenin acetate, followed by the removal of 9α-bromine by the action of zinc and acetic acid; and m.p. 224°–29°, [α] − 39.4° (obtained from the oxidation of 7-dehydro-diosgenin acetate). The minor product (lower Rf) was 9α-fluoro-11β-hydroxytigogenin acetate, yield 0.1 g (20 percent), recrystallised from methanol (rectangular plates). m.p. 228°–30°· [α]$^{26}$ − 52.65° (c, 0.95)· $\nu_{max}$ 3600 (OH), 1725 and 1250 (acetate). Found: C, 70.44; H, 9.24; F, 4.01; $C_{29}H_{45}O_5F$ requires C, 70.74; H, 9.14; F, 3.86 percent.

EXAMPLE 17

9α-Fluoro-11β-hydroxy-tigogenin acetate

The β-epoxide from Example 15 (1.0 g) was dissolved in dichloromethane (20 ml) and added dropwise whilst stirring to a solution of anhydrous HF (10 ml) in dichloromethane (30 ml, containing 20 percent pyridine) at −70°. It was then stirred at −70° for a further period of 3 hours and later allowed to stand at room temperature overnight. Aqueous potassium carbonate (5 percent, 50 ml) was carefully added and the reaction mixture was extracted with dichloromethane (3 × 100 ml). After the usual work up followed by room temperature reacetylation, the 9α-fluoro-11β-hydroxy-tigogenin acetate could be obtained in pure form by direct recrystallisation of the residue from methanol. Yield 0.55 g (52 percent).

EXAMPLE 18

Methyl 9α-fluoro-11-keto-tigogenoate acetate

The fluorohydrin from Example 17(0.275 g) in glacial acetic acid (14 ml) was treated at room temperature with a solution of chromium trioxide (0.3 g) in 80 percent acetic acid (3 ml) with vigorous stirring. After stirring for 3.5 hours at room temperature, ethanol (3 ml) was added to destroy the excess of the oxidant and after 15 minutes, water (100 ml) was added and finally it was extracted with ether (3 × 50 ml). The organic layer was washed, dried and concentrated. the residue was redissolved in dichloromethane (10 ml) and treated at 0° with an excess of ethereal diazomethane (10 ml). After 1 hour, solvents were removed and the crude product was purified by p.l.c. Pure yield 0.21 g (70 percent). An analytical sample was made by t.l.c. purification and repeated recrystallisations from ethanol (long needles). m.p. 194°–96°. [α]$^{25}$ − 143.8° (c, 0.99)· $\lambda_{max}$ 1725 (methyl ester, acetate), 1250 (acetate) and a broad carbonyl region from 1710–1690 cm$^{-1}$. Found: C, 67.15; H, 8.03; $C_{30}H_{43}O_7F$ requires C, 67.40; H, 8.04 percent.

EXAMPLE 19

9α-Fluoro-11-keto-16α,26,26-trimethyl-tigogenin acetate

The methyl ester from Example 18 (0.35 g) was dissolved in THF (10 ml) and added (5 minutes) into a Grignard reagent made from magnesium (0.175 g, 10 equivalent), methyl iodide (1.5 ml) and dry ether (10 ml) at 0° in an atmosphere of dry nitrogen. The reaction was worked up after further 25 minutes by adding cold 3N sulphuric acid (5 ml) and later extracted with ether (3 × 100 ml). The ether layer was washed with water, dried and evaporated and the residue was reacetylated at room temperature with acetic anhydride in pyridine (1:1, 3 ml) overnight. After the usual work up, product was isolated by preparative layer chromatography (most non polar) and purification was achieved by recrystallisation from absolute ethanol (rhomboids) to yield pure, 9α-fluoro-11-keto-16α, 26, 26-trimethyl-tigogenin acetate. 0.185 g (55 percent). m.p. 227°–29°· [α]$^{25}$ − 36.65° (c, 0.955)· $\nu_{max}$ 1725 (acetate), 1700 (11-ketone) and 1250 (acetate). Found: C, 72.36; H, 9.07; $C_{32}H_{49}O_5F$ requires C, 72.17; H, 9.27 percent.

EXAMPLE 20

3β-acetoxy-9α-fluoro-11-keto-16α-methyl-16β-hydroxy-20-carboxypregnane γ-lactone The trimethyl ketal from Example 19 (0.1 g) in glacial acetic acid (4 ml) was treated with chromium trioxide (0.12 g) in 80 percent acid solution (2 ml) and stirred at room temperature for 45 minutes. Water (20 ml) was added and the reaction mixture was extracted with ether (3 × 50 ml). The ether extract was washed with water, aqueous sodium bicarbonate (5 percent, 25 ml) and then with water. It was dried, evaporated and the residue was purified by t.l.c. to afford, after crystallisation from methanol (needles), pure γ-lactone 48 mg (59 percent). m.p. 291°–93°· $[\alpha]^{22} - 42.8°$ (c, 2.22)· $\nu_{max}$ 1770 (γ-lactone) broad carbonyl band, 1725 (acetate), 1700 (11-ketone) and 1250 (acetate). Found: C, 69.08; H, 8.24; $C_{25}H_{35}O_5F$ requires C, 69.10; H, 8.12 percent.

EXAMPLE 21

3β-Acetoxy-9α-fluoro-11-keto-16-methyl-pregn-16-en-20-one

The trimethyl ketal from Example 19(0.145 g) was refluxed in acetic anhydride (6 ml) containing ammonium chloride (20 mg) for 8 hours in nitrogen. Most of the acetic anhydride was removed in vacuo and the residue was dissolved in acetic acid (6 ml) and treated at 0° with chromium trioxide (0.3 g) dissolved in 80 percent acetic acid (2 ml). The mixture was stirred at room temperature for 3 hours, before addition of water (50 ml) and ether extraction (3 × 50 ml). The ether solution was washed with water, dried and concentrated. The residue was dissolved in t-butanol (10 ml) and treated at 10°C with potassium hydroxide solution (0.5 g in 1 ml water). It was agitated at room temperature for 90 minutes, before adding water (50 ml) and ether extraction. The ether extract was washed with saturated sodium chloride, dried and the residue obtained after the removal of ether, was reacetylated with acetic anhydride in pyridine at room temperature overnight. After the usual work up, pure product was obtained by preparative layer chromatography and recrystallisation from methanol (bright plates), yielded 53 mg (48 percent). m.p. 194°–96°·$[\alpha]^{25} + 13°$ (c, 0.5)·$\lambda_{max}$ 248 nm ($\epsilon$, 10,040). $\nu_{max}$ 1730, 1250 (acetate), 1705 (11-ketone), 1650 (20-ketone), 1605 (double bond). Found C, 71.22; H, 8.40; $C_{24}H_{33}O_4F$ requires C, 71.28; H, 8.22 percent.

EXAMPLE 22

Enol-lactone from $\Delta^{9(11)}$-hecogenoic acid acetate $\Delta^{9(11)}$-Hecogenoic acid acetate (0.25 g) was refluxed in acetic anhydride (10 ml) containing freshly fused sodium acetate (25 mg), in an atmosphere of nitrogen. The reaction in which the disappearance of polar acid was observed (t.l.c. control), was completed in 6 hours. Most of the acetic anhydride was removed in vacuo and the residue was extracted with ethyl acetate (3 × 50 ml). The organic layer was washed with water, aqueous sodium bicarbonate (5 percent, 3 × 25 ml) and finally with water. It was dried and concentrated, and the residue was placed in contact with methanol at 0°, when a crystalline solid, δ-lactone separated out. Yield 60 mg (25 percent). An analytical sample was made by t.l.c. purification and repeated recrystallisations from methanol (fine needles), m.p. 218°–20°· $[\alpha]^{26} - 33.5°$ (c, 1.05)·$\lambda_{max}$ 237 nm ($\epsilon$, 13,100). $\nu_{max}$ 1760 (δ-lactone), 1725, 1250 (acetate), 1685 (16-ketone), 1650 (12-ketone) and 1605 cm$^{-1}$ ($C_9$–$C_{11}$ double bond). Found: C, 71.84; H, 8.08; $C_{29}H_{38}O_6$ requires C, 72.17; H, 7.94 percent.

EXAMPLE 23

3β-Acetoxy-20ε-methoxycarbonyl-pregn-9(11)-ene-12,16-dione

The 67-lactone from Example 22 (0.1 g) was dissolved in dichloromethane (10 ml, containing 1 percent pyridine) and at −70° was treated with a slow stream of ozone. The reaction (t.l.c. control) was completed in 6 minutes, and later the reaction mixture was allowed to attain the room temperature. It was then extracted with dichloromethane (3 × 25 ml), the organic layer was washed with water, dilute hydrochloric acid (3 × 5 ml) and finally with water. It was then dried, concentrated and the residue was esterified in its dichloromethane solution (5 ml) with ethereal diazomethane (10 ml) at 0°. Solvents were removed and the products were separated by t.l.c. purification. Pure 3β-acetoxy-20-ε-carbomethoxy-pregn-9(11)-ene-12,16-dione was obtained by repeated recrystallisation from absolute ethanol (fine needles). Yield 27 mg (30 percent)· m.p. 226°–28°·$[\alpha]^{26} - 43.5°$ (c, 0.9)·$\lambda_{max}$ 237 nm ($\epsilon$, 11,000)·$\nu_{max}$ 1725 (methyl ester, acetate), 1670 (12-ketone), 1605 (double bond) and 1250 (acetate). Found: C, 69.71; H, 7.96; $C_{25}H_{34}O_6$ requires C, 69.77; H, 7.91 percent.

EXAMPLE 24

9α,11α-Epoxy-tigogenamide acetate

Triethylamine (4.4 ml, 20 equivalent) was slowly added to a stirred solution of 9α,11α-epoxy-tigogenoic acid acetate (1.04 g) in dry chloroform (40 ml) at 0°. After 30 minutes, ethyl chloroformate (2.2 ml, 10 equivalent) was added carefully and reaction mixture was stirred vigorously at 0° for 2 hours. It was then allowed to attain the room temperature (1 hour) and later warmed to 40° for 2 hours. It was then cooled to 0° and treated with an excess of liquid ammonia (40 ml). The reaction mixture was then stirred at room temperature overnight, before extraction with chloroform (3 × 150 ml). The organic layer was washed once with saturated sodium chloride (50 ml) and then dried and concentrated. The residue, in benzene was filtered through an alumina Gr V column and eluted first with benzene and then with 5 percent acetone in benzene. The most polar compound obtained in the last fractions was collected, evaporated and recrystallised from benzene to yield 9α,11α-epoxytigogenamide acetate 0.625 g (62 percent), needles from benzene. m.p. 185°–88°· $[\alpha]^{26} - 167.5°$(c, 0.985)·$\nu_{max}$ 3400, 3170 (−COHN$^2$), 1725, 1250 (acetate), 1700 (22-ketone) and 1670 cm$^{-1}$ (−CONH$_2$)· Found: C, 69.61; H, 8.52; N, 2.79; $C_{29}H_{43}O_6N$ requires C, 69.43; H, 8.64; N, 2.79 percent.

EXAMPLE 25

9α,11α-epoxy-tigogenonitrile acetate
Method I

9α,11α-epoxy-tigogenamide acetate (0.1 g) was treated at room temperature with acetic anhydride (4 ml) containing freshly fused sodium acetate (10 mg) for 2 hours. No reaction was observed (t.l.c.). The mixture was then refluxed in a slow current of dry nitrogen and the t.l.c. indicated that the reaction was completed in 3 hours. Most of the acetic anhydride was removed in vacuo and the residue was treated with cold water (10 ml) and ether extracted (3 ×50 ml). The ether extract was washed with water, dried and on evaporation, the crude reaction product was purified by t.l.c. Repeated recrystallisation from methanol, afforded pure (long needles) 9α,11α-epoxy-tigogenonitrile acetate yield 25 mg (28 percent) m.p. 178°–79° $[\alpha]^{25} - 147.2°$ (c, 0.985) $\nu_{max}$ 2240 (nitrile), broad carbonyl region, 1725 and 1250 cm$^{-1}$ (acetate). Found: C, 71.98; H, 8.52; N, 2.84; $C_{29}H_{41}O_5N$ requires C, 72.01; H, 8.55; nitrogen 2.90 percent.

Method II

The amide (10 mg) was dissolved in dry pyridine (1.5 ml) and treated at 0° with thionyl chloride (0.1 ml) and the reaction mixture was stirred at 0° for 1 hour. Cold water (10 ml) was added and extracted with ether (3 × 15 ml). The ether layer was washed with water, dried and concentrated. Traces of pyridine were removed by the azeotropic distillation with toluene. T.l.c. indicated that the major product of this reaction had the same Rf as that of nitrile prepared in Method I and the I.R. indicated the presence of "nitrile" peak at 2240 cm$^{-1}$. This product was not characterised further.

EXAMPLE 26

Lactam analogue of 9α,11α-epoxy-16α-methyl-26-oxo-tigogenin acetate

9α,11α-Epoxy-tigogenamide acetate (0.4 g) was dissolved in THF (15 ml) and added (5 minutes) into a Grignard reagent made from magnesium (0.2 g, 10 equivalent), methyl iodide (1.5 ml) and dry ether (15 ml) at 0°, in dry nitrogen atmosphere. It was further stirred at 0° for 40 minutes, before working it up by the addition of saturated aqueous ammonium chloride (25 ml) and ether extraction (3 × 100 ml). The ether extract was washed, dried and evaporated and the residue was reacetylated with acetic anhydride (2 ml) and pyridine (2 ml) at room temperature overnight. After the usual work up, the crude product was recrystallised from ethanol (prisms) to yield the 22 → 26 δ-lactam, 0.3 g (75 percent). m.p. 240°–42° $[\alpha]^{25} - 41.2°$ (c, 0.85) $\nu_{max}$ 3220 (—CONH—), 1725, 1250 (acetate) and 1660 cm$^{-1}$ (—CONH—). Found: C, 72.00; H, 8.97; N, 2.62; $C_{30}H_{45}O_5N$ requires C, 72.11; H, 9.08; N, 2.80 percent.

EXAMPLE 27

3β-Acetoxy-9α,11α-epoxy-16-methylpregn-16-en-20-one from the δ-lactam of Example 26

Method I

The δ-lactam from Example 26 (0.15 g) was refluxed in acetic anhydride (5 ml) containing pyridine hydrochloride (15 mg) for 4 hours (t.l.c. control) in dry nitrogen. Most of the acetic anhydride was removed in vacuo and the residue was dissolved in glacial acetic acid (5 ml) and oxidised by the addition of chromium trioxide (0.25 g) in 80 percent acetic acid (2 ml) at room temperature for 3 hours. Water (50 ml) was added and the reaction mixture was extracted with ether (3 × 100 ml). The organic layer was washed, dried and evaporated. The residue was dissolved in methanol (15 ml) and saponified by means of methanolic potassium hydroxide (0.5 g). After being stirred at room temperature for 3 hours, it was acidified with acetic acid and concentrated. Water (25 ml) was added to the residue and it was then extracted with ether. The residue after ether evaporation was reacetylated at room temperature with acetic anhydride in pyridine. After the usual work up, the product was isolated by t.l.c. and purified by recrystallisation from methanol. Yield of the pure compound 26 mg (22.5 percent) m.p. 174°–77°. Mixed melting point with previously prepared sample of 3β-acetoxy, 9α, 11α-epoxy-16-methyl-pregn-16-en-20-one 173°–77°.

Method II a. The δ-lactam (30 mg) was refluxed in acetic anhydride (2.5 ml) containing fused sodium acetate (5 mg) for 6 hours in dry nitrogen. Most of the acetic anhydride was removed in vacuo and last traces were eliminated by the azeotropic distillation of the material with toluene. The residue was separated by t.l.c. and the pure compound, 3β-acetoxy-9α-11α-epoxy-16α-methyl-26-nor-26(N-acetyl)-carbamido-furost-20(22)ene was obtained (plates) from methanol. Yield 21 mg (64 percent) m.p. 173°–75° $[\alpha]^{26} - 33.5°$ (c, 1.2) $\lambda_{max}$ 3300 (Ac—NH—CO—), 1725 (acetate), broad carbonyl region centered at 1700 (Ac—NH—CO—) and 1665 cm$^{-1}$ (Ac—NH—CO—). Found: C, 70.64; H, 8.69; N, 2.58; $C_{32}H_{47}O_6N$ requires C, 70.94; H, 8.75; N, 2.59 percent.

b. A slow stream of ozone was passed through a solution of the product of stage (a) (30 mg) in dichloromethane (5 ml, containing 1 percent pyridine) at −70° for 5 minutes (t.l.c. control). It was then allowed to attain the room temperature and later extracted with dichloromethane (3 × 20 ml). The organic layer was washed with water, dried and evaporated. The residue was dissolved in methanol (5 ml) and saponified with methanolic potassium hydroxide (50 mg) and room temperature for 2 hours. It was then acidified (acetic acid) and extracted with ether. The residue obtained after evaporation of the ether extract was reacetylated with acetic anhydride in pyridine at room temperature overnight. After the usual work up, the crude products were separated by t.l.c., to yield the title product, 10 mg (47 percent); m.p. 174°–76°. No depression in the melting point was observed when it was mixed with a sample of the product from Method I.

EXAMPLE 28

Lactam analogue of 9α,11α-epoxy-16α-ethyl-26-oxo-tigogenin acetate:

9α,11α-epoxy-tigogenamide acetate (0.75 g) was dissolved in THF (20 ml) and added (5 minutes) into a Grignard reagent made from magnesium (0.38 g, 10 equivalent), ethyl iodide (1.5 ml) and dry ether (20 ml) at 0° in dry nitrogen. It was further stirred at 0° for 40 minutes, before the addition of saturated aqueous ammonium chloride solution (25 ml) and extraction with ether (3 × 100 ml). The organic layer was washed with water, dried and evaporated. The residue was reacetylated at room temperature with acetic anhydride (3 ml) in pyridine (3 ml) overnight. After the usual work up, the title compound was separated by preparative layer chromatography. Yield 0.33 g (45 percent), recrystallised from absolute ethanol (prisms). m.p. 236°–39° $[\alpha]^{25} - 39.8°$ (c, 1.89) $\lambda_{max}$ 3250 (—NH—CO—), 1730, 1250 (acetate) and 1660 cm$^{-1}$ (—NH—CO—). Found: C, 72.74; H, 9.11; N, 2.67; $C_{31}H_{47}O_5N$ requires C, 72.48; H, 9.22; N, 2.73 percent.

EXAMPLE 29

3β-Acetoxy-9α,11α-epoxy-16-ethylpregn-16-en20-one

9α,11α-epoxy-tigogenamide acetate (0.25 g) in dry THF (10 ml) was subjected to the Grignard reaction with $C_2H_5MgI$ (from magnesium 0.125 g, ethyl iodide 1.5 ml and ether 10 ml) as before and the resulting 16α-ethyl δ-lactam without isolation, was subjected to the three step degradation sequence:

The crude δ-lactam was refluxed in acetic anhydride (3 ml) containing fused sodium acetate (30 mg) for 6 hours in dry nitrogen. Most of the acetic anhydride was removed in vacuo and the residue was dissolved in acetic acid (6 ml) and oxidised with chromium trioxide (0.5 g) in 80 percent acetic acid (2 ml) at room temperature for 3 hours. After the usual work up, the crude products were dissolved in t-butanol (10 ml) and saponified with potassium hydroxide (0.5 g in 1 ml water) at room temperature for 3 hours. The reaction mixture was diluted with water (25 ml), acidified (acetic acid) and then ether extracted (3 × 50 ml). The ether extract was washed with water, dried and concentrated. The residue was reacetylated at room temperature with acetic anhydride in pyridine, overnight and later worked up as usual. The crude products were separated by preparative layer chromatography, and the pure compound was obtained by recrystallisation from methanol. Yield 31 mg (15 percent), m.p. 184°–86°. Mixed melting point with 3β-acetoxy-9α,11α-epoxy-16-ethylpregn-16-en-20-one 183°–86°.

EXAMPLE 30

Lactam analogue of 9α,11α-epoxy-16α-isopropyl-26-oxotigogenin acetate

9α,11α-epoxy-tigogenamide acetate (0.4 g.) was dissolved in dry THF (20 ml) and added during 5 minutes, into a Grignard reagent made from magnesium (0.2 g, 10 equivalent), isopropyl bromide (1.5 ml) and dry ether (15 ml) at 0° with vigorous stirring. It was further stirred at 0° for 30 minutes, before adding saturated aqueous ammonium chloride (25 ml) and ether extraction (3 × 100 ml). The ether layer was washed with water, dried and evaporated. The crude residue was reacetylated at room temperature with acetic anhydride (3 ml) and pyridine (3 ml), left standing at room temperature overnight, before working up in the usual manner. The crude products were separated by p.l.c. and further purification was achieved by recrystallisation from methanol (glistening plates). Yield 65 mg (16 percent) m.p. 248°–51°. $[\alpha]^{23} - 53.9°$ (c, 1.41) $\nu_{max}$ 3250 (—NH—CO—), 1730, 1250 (acetate) and 1680 $cm^{-1}$ (—NH—CO—). Found: C, 72.77; H, 9.27; N, 2.56; $C_{32}H_{49}O_5N$ requires C, 72.83; H, 9.36; N, 2.65 percent.

EXAMPLE 31

3β-Acetoxy-9α,11α-epoxy-16-methyl-pregn-16-en-20-one a. The γ-lactone of 3β-acetoxy-9α,11α-epoxy-16α-methyl-16β-hydroxy-20-carboxy-pregnane (63 mg) was dropped into the oxygenation flask containing potassium t-butoxide (100 mg), hexamethylphosphoric triamide (1 ml) and dioxan (5 ml) and was then shaken with oxygen. The reaction was stopped after 20 minutes, when the uptake of oxygen was observed to be 4 ml (the calculated volume for 1 equivalent oxygen being 3.6 ml). The reaction mixture was heated over a water bath for 30 minutes, in a current of nitrogen, cooled, acidified with 2N sulphuric acid and extracted with ether (3 × 50 ml). The ether extract was washed with water, dried and then concentrated. The residue was reacetylated with acetic anhydride in pyridine at room temperature. After the usual work up, the products were separated by t.l.c. and crystallisation from methanol, afforded pure compound, yield 12 mg (20 percent), m.p. 170°–72°. No depression in melting point was observed when mixed with an authentic sample of 3β-acetoxy-9α,11α-epoxy-16-methyl-pregn-16-en-20-one b. 9α,11α-Epoxy-16α-methyl-26-oxo-tigogenin acetate (62 mg) in dioxan (5 ml) and hexamethylphosphoric triamide (1.5 ml) was oxygenated in the presence of potassium t-butoxide (180 mg), for 20 minutes during which time oxygen (5.0 ml) was absorbed (calculated 1 equivalent oxygen 4.8 ml). The reaction mixture was then heated over a water bath in a current of nitrogen, for 30 minutes. It was cooled, acidified with 2N sulphuric acid and then ether extracted (3 × 50 ml). The ether layer was washed with water, dried and concentrated. The residue was reacetylated with acetic anhydride-pyridine and after the usual work up was separated by t.l.c. Pure compound was obtained from methanol. Yield 13 mg (27 percent). m.p. 172°–75°. Melting point when mixed with a sample of authentic 3β-acetoxy-9α,11α-epoxy-16-methyl-pregn-16-en-20-one, 170°–73°.

In the above Examples, all melting points were determined on the Kofler block and are uncorrected. Optical rotations were determined on chloroform solutions IR spectra were determined on Nujol (Registered Trade Mark) mills and UV spectra were determined on ethanol solutions. Petroleum ether where used boiled in the range 60°–80°C. Reacetylations were effected overnight at room temperature using acetic anhydride-pyridine.

We claim:

1. A process for the preparation of a compound of the general formulae

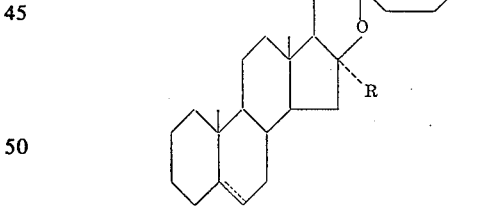

VII or

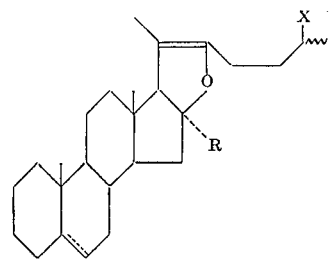

III wherein:
the dotted line represents the presence or absence of a double bond;
Y is —O.CO—, —O.C(R)$_2$—, —NR$^1$CO—, —N=CR— or —NH.C(R)$_2$—;
X is a carboxyl, nitrile or tertiary carbonamido group;
R is an alkyl group
R$^1$ is a hydrogen atom or the N-attached residue of a secondary amide; or wherein said compound is substituted at the 3-position by a hydroxy, etherified hydroxy, esterified hydroxy or protected keto group; or in the 6-position by a halogen atom or methyl group; or in the 9-position by a halogen atom; or in the 11- or 12-position by a hydroxy, etherified hydroxy, esterified hydroxy, keto or protected keto group or halogen atom; or an epoxy group in the 9,11-position; or a double bond in the 9,11-position together with a 12-keto group; which comprises reacting a compound of the general formula

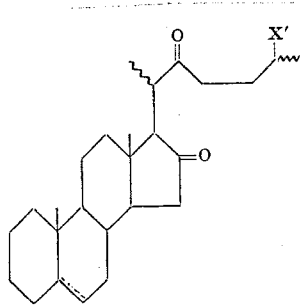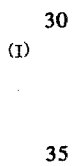

(I)

wherein
X' is a carboxyl, carboxyl ester, carbonamide, substituted carbonamide or nitrile group; or a corresonding compound substituted as defined above, with a carbon nucleophile selected from the group consisting of an alkyl magnesium halide, an alkyl lithium, an alkyl cadmium Grignard reagent, an alkyl zinc Grignard reagent, and an alkyl thallium Grignard reagent.

2. A process as claimed in claim 1 in which sufficient nucleophile is present to allow for reaction with all reactive groupings present.

3. A process as claimed in claim 1 in which the initial product of structure VII, where Y represents other than the —O·CO— grouping, is subjected to a three-stage degradation comprising
a. acylolytic fission of the spiroketal system to form a pseudosapogenin;
b. oxidative cleavage of the 20,22-double bond of the pseudosapogenin to form a 16-acyloxy-pregn-20-one;
and c. hydrolysis with dehydration to form the desired **$^{16}$-pregn-20-one.

4. A process as claimed in claim 3 in which the acylolytic fission is effected with acetic anhydride.

5. A process as claimed in claim 1 in which the initial product of formula III as defined in claim 1 is subjected to a two-stage degradation comprising stages (b) and (c) as defined in claim 6.

6. A process as claimed in claim 1, in which the initial product of structure VII where Y represents the grouping —O·CO— is converted directly into the corresponding Δ$^{16}$-pregn-20-one by base-catalysed autoxidation in a cyclic ether solvent.

7. A process as claimed in claim 6 in which the autoxidation is effected in the presence of an alkali metal alkoxide.

8. A process as claimed in claim 3 in which the acylolytic fission in stage (a) is catalyzed by an agent selected from the group consisting of Lewis acids, sodium acetate, zinc acetate, trichloroacetic acid, aluminium chloride, pyridine hydrochloride, ammonium chloride and methylammonium chloride; the oxidative cleavage in stage (b) is effected with an oxidising agent selected from the group consisting of chromium trioxide, chromic-acetic acid solutions, ozone, alkaline permanganate, and osmium tetroxide to form a glycol which is then cleaved with lead tetraacetate or a periodate; and the hydrolysis in stage (c) is effected with a base.

9. A process as claimed in claim 1 in which a compound obtained having structure VII or a corresponding compound substituted as defined in claim 26, where Y represents the grouping —O·C(R)$_2$—, is oxidized to the corresponding γ-lactone having the general formula

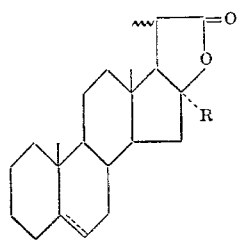

VIII or a corresponding compound substituted as defined in claim 26, wherein R and the dotted line are as defined in claim 26; and the γ-lactone in turn is subjected to base-catalyzed autoxidation in a cyclic ether solvent to form the corresponding Δ$^{16}$-pregn-20-one.

10. A compound having the general formulae

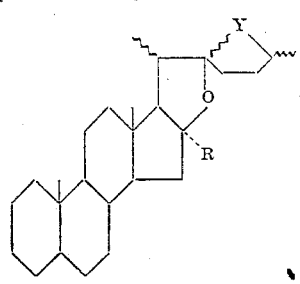

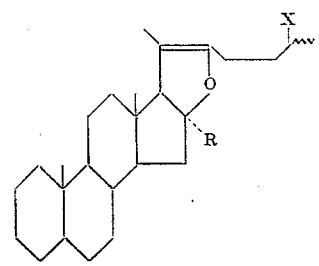

or

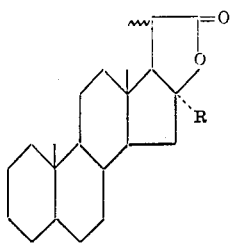

wherein
Y is —O·CO—, —O·C(R)₂—, —NR¹CO—, —N=CR or —NH·C(R)₂—,
X is a carboxyl, nitrile or tertiary carbonamido group;
R is an alkyl group
R¹ is a hydrogen atom or the N-attached residue of a secondary amide; or wherein said compound is substituted at the 3-position by a hydroxy, etherified hydroxy, esterified hydroxy or protected keto group; or in the 6-position by a halogen atom or methyl group; or in the 9-position by a halogen atom; or in the 11-position by a hydroxy, etherified hydroxy, esterified hydroxy, keto or protected keto group or halogen atom; or an epoxy group in the 9,11-position; or a double bond in the 9,11-position together with a 12-keto group.

11. A compound according to claim 10 containing a 9α,11α-epoxy group or a 9α-fluoro group together with an 11-keto group.

12. A compound having the general formula

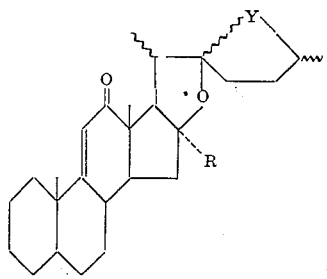

or

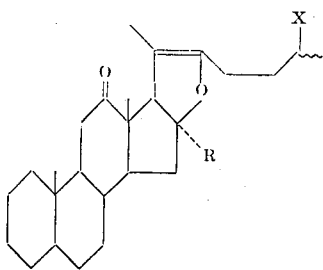

wherein
Y is —O·CO—, —O·C(R)₂—, —NR¹CO—, —N=CR or —NH·C(R)₂—;
X is a carboxyl, nitrile, or tertiary carbonamido group;
R is an alkyl group;
R¹ is a hydrogen atom or the N-attached residue of a secondary amide; or wherein said compound is substituted at the 3-position by a hydroxy, etherified hydroxy, esterified hydroxy or protected keto group; or in the 6- position by a halogen atom or methyl group.

13. A compound having the general formula

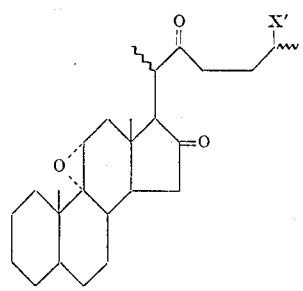

or

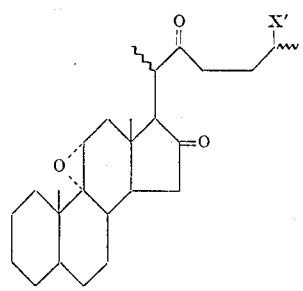

wherein
X' is a carboxyl, carboxyl ester, carbonamide, substituted carbonamide or nitrile group; or wherein said compound is substituted at the 3-position by a hydroxy, etherified hydroxy, esterified hydroxy or protected keto group.

* * * * *

PO-1050
(5/69)

UNITED STATES PATENT OFFICE
CERTIFICATE OF CORRECTION

Patent No. 3,755,304  Dated August 28, 1973

Inventor(s) Derek Harold Richard Barton and Peter George Sammes

It is certified that error appears in the above-identified patent and that said Letters Patent are hereby corrected as shown below:

Column 20, line 15, --and-- should be inserted after "ozone,".

Column 20, line 16, "and" should be --or with--.

Column 21, line 12, "-N=CR" should be -- -N=CR- --.

Column 21, line 28, "compound" should be --tigogenin--.

Column 21, line 30, --and substituted at the 3-position by a hydroxy, etherified hydroxy, esterified hydroxy or protected keto group-- should be inserted after "11-keto group".

Column 21, line 31, "compound" should be --hecogenin--.

Column 21, lines 45-55, the formula

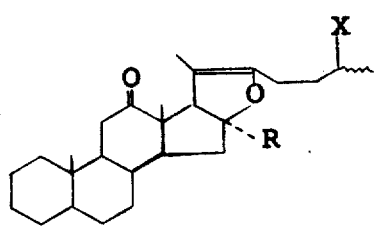   should be   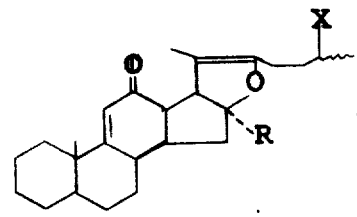

Column 22, line 2, "-N=CR" should be -- -N=CR- --.

Column 22, line 8, "or" should be --and--.

Patent No. 3,755,304         Dated   August 28, 1973

Inventor(s) DEREK HAROLD RICHARD BARTON and PETER GEORGE SAMMES

Column 22, line 11, "or" should be --and-- and --, hydrogen atom-- should be inserted after "halogen atom".

Column 22, line 13, "compound" should be --tigogenin or hecogenin--.

Column 22, lines 35-45, the formula

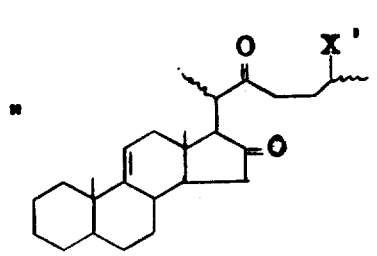   should be   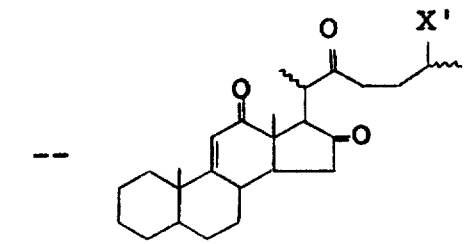

Column 22, line 47, "or", second occurrence, should be deleted.

Column 22, line 50, --, and in the 6-position by a halogen atom, hydrogen atom, or methyl group-- should be inserted after "keto group".

Signed and sealed this 14th day of January 1975.

(SEAL)
Attest:

McCOY M. GIBSON JR.                C. MARSHALL DANN
Attesting Officer                  Commissioner of Patents